United States Patent
Reime

(10) Patent No.: US 6,276,206 B1
(45) Date of Patent: Aug. 21, 2001

(54) ACCELERATION SENSOR FOR DETECTING INERTIA FORCES

(76) Inventor: Gerd Reime, Friedenstrasse 88, D-75328 Schömberg (DE)

(*) Notice: Subject to any disclaimer, the term of this patent is extended or adjusted under 35 U.S.C. 154(b) by 0 days.

(21) Appl. No.: 09/355,125

(22) PCT Filed: Jan. 21, 1998

(86) PCT No.: PCT/EP98/00305

§ 371 Date: Jul. 23, 1999

§ 102(e) Date: Jul. 23, 1999

(87) PCT Pub. No.: WO98/33072

PCT Pub. Date: Jul. 30, 1998

(30) Foreign Application Priority Data

Jan. 24, 1997 (DE) .............................. 197 02 392
Jun. 4, 1997 (DE) .......................... 297 09 688 U

(51) Int. Cl.⁷ .................................................. G01P 15/00
(52) U.S. Cl. ............................................. 73/514.09
(58) Field of Search ...................... 73/514.09, 514.05, 73/514.06, 514.07, 514.12, 514.13, 514.16

(56) References Cited

U.S. PATENT DOCUMENTS

| | | | | |
|---|---|---|---|---|
| 2,713,726 | * | 7/1955 | Dixson ........................... | 73/514.09 |
| 3,008,334 | * | 11/1961 | Lees ................................ | 73/514.09 |
| 3,164,023 | * | 1/1965 | Holderer ........................ | 73/514.09 |
| 3,258,974 | * | 7/1966 | Diamond ........................ | 73/514.09 |
| 3,260,121 | * | 7/1966 | Johnston ........................ | 73/514.09 |
| 3,442,023 | | 5/1969 | Remington et al. ............ | 73/514.05 |
| 3,481,205 | * | 12/1969 | Schmidlin ...................... | 73/514.09 |
| 3,499,331 | * | 3/1970 | Miller .............................. | 73/514.09 |
| 3,580,087 | * | 5/1971 | Sampson ........................ | 73/514.09 |
| 3,992,951 | | 11/1976 | Erspamer et al. .............. | 73/497 |

FOREIGN PATENT DOCUMENTS

| | | |
|---|---|---|
| 2 311 310 | 12/1976 | (FR) . |
| 2 022 822 | 12/1979 | (GB) . |
| 2 032 110 | 4/1980 | (GB) . |
| 87 05569 | 9/1987 | (WO) . |
| 9501561 | 1/1995 | (WO) . |

* cited by examiner

Primary Examiner—Helen Kwok
(74) Attorney, Agent, or Firm—Cantor Colburn LLP

(57) ABSTRACT

The invention relates to an acceleration sensor for detecting inertia forces, in which several separable and non-miscible media are stored in a receptacle and from at least one interphase between the media. Differentiation agents are provided to distinguish dynamic changes of position of the interphase from static changes of position, and evaluation agents evaluate the dynamic changes of position for the gradual determination of acceleration. An acceleration sensor that reacts sensitively to acceleration and deceleration, but which emits no signal when the sensor is rotated away from zero-position is thus created.

17 Claims, 5 Drawing Sheets

ACCELERATION SENSOR FOR DETECTING INERTIA FORCES

REFERENCE TO RELATED APPLICATION

The present application stresses the priority of German Patent Application 197 02 392.4 of Jan. 24, 1997 and the German Utility Patent 297 09 688.5 of Jun. 3, 1997, the disclosure content of which also is a subject of the present invention.

AREA OF THE INVENTION

The invention concerns an accelerometer for detecting inertial forces. Essentially, changes independent of time are understood as static position changes and essentially, time-dependent changes are understood as dynamic position changes.

PRIOR ART

An accelerometer of this kind is known from GB 2 022 822 A with a phase boundary between a liquid and air in a vessel. In this case, light is beamed through the phase boundary, detection means detecting the varying reflective index as a result of a motion of the sensor and this the phase boundary. Differential means are provided which make it possible to differentiate a time-dependent change of the phase boundary based on a vibration from a change dependent on time and based on simple motion. Evaluation means make it possible to determine the time-dependent change in the phase boundary as acceleration in stages.

A sensor completely filled with gas and liquid, in the case of which measuring sections are formed with a reflex light barrier, is known from WO 87/05569. A change in the reflection behavior is evaluated as an acceleration signal for triggering an occupant-protection device of a motor vehicle. However, low deceleration values cannot be determined reliably with this.

A sensor, in the case of which a phase boundary is detected between an external, approximately ring-shaped electrode and a central electrode, is known from FR-A 2 311 310. In this way it is not possible to interrogate the measuring sections in each case, so that this sensor is not in a position to make static changes differentiable from dynamic changes.

An accelerometer with a phase boundary between two media is known from GB-A 2 032 110, two measuring sections being formed between two emitting elements and one sensing element separated therefrom. The difference values detectable thereby are not free of environmental influences, such as, e.g., an aging of the sensor or evaporation of liquid, but in particular the sensor is not capable of differentiating dynamic positional changes from static positional changes of the phase boundary.

An acceleration sensor of this kind is known from U.S.-A No. 39,929,512. Two media, a liquid medium and a gaseous medium, which form a phase boundary between them, are provided in a housing. In the case of an acceleration, electrodes, which detect the positional change of the phase boundary from gradual determination of the acceleration, are provided as detection means. If a sensor of this type is turned out of the zero position, an acceleration signal is produced, although an acceleration has not actually taken place. A comparable device is known from U.S. Pat. No. 3,442,023.

A sensor, which in particular is suited for detecting the wetting of a surface, in an optical and also capacitive way, is known as a detection element from WO-A 95/01561. The detection is performed at least at two measuring sections, which are acted upon alternately, the measured values being detected with the same timing, e.g. by light or field sensitive elements. The measured values detected are fed to a comparator for difference value formation and a detection signal is determined from this. This detection signal is leveled as compared with zero with the use of a time constant adjusted to the respective application purpose, so that outside influences can be largely suppressed. For the leveling the output power of the sensor or the amplification power of the receiver is regulated on the basis of the signal determined. The leveling also makes a relatively rapid dynamic time-dependent detection of the changes possible.

Further there are known to be accelerometers which have great mass inertias, so that, in particular, in the case of use in a motor vehicle the regular motions of the vehicle at the time of driving along streets or in uneven terrain do not lead to accelerations. Therefore a corresponding acceleration signal is produced only when there is a strong acceleration, more precisely a deceleration, e.g. in the case of an accident. A sensor of this type is used, e.g. for triggering the air bag.

SUMMARY OF THE INVENTION

Starting from this prior art, the object of the present invention is to create an accelerometer reacting to acceleration and deceleration sensitively, but which produces almost no signal if the sensor is turned out of the zero position.

This object is attained by means of an accelerometer.

The accelerometer comprises a vessel having several separable and immiscible media held therein, wherein at most one medium is gaseous and the other media are liquid; at least one phase boundary formed between the media; a detector which detects a static positional change of the phase boundary in the case of an appearance of acceleration; and an evaluator which evaluates a dynamic positional change for gradual determination of the acceleration. The detector detects the positional change of phase boundaries which are formed by at least three separable and immiscible media as a detection signal, at least two of media being liquid. The detector determines the detection signal as an acceleration signal and feeds the acceleration signal to the evaluator. The media form at least two phase boundaries as a discriminating means for discriminating the dynamic positional change from the static positional change.

In this case different media are arranged over one another, the positional changes of the phase boundary between these media being detected in the case of the appearance of an acceleration. Of course, in order to differentiate accelerations to be detected from static positional changes, differentiation means are provided which make the time-dependent dynamic changes detectable so long as it is not a matter of accelerations remaining constant for a longer time, such as e.g., the constant radial acceleration of a car body moving uniformly.

Thus different media are arranged over one another so that in the case of a positional change of the accelerometer with velocity remaining the same, almost no signal is emitted, since the phase boundaries between the different media follow this motion uniformly. On the other hand, if there is an acceleration or deceleration, the phase boundaries behave differently with respect to time because of their different physical properties, so that these two phase boundaries provide a dynamic, unambiguous gradual acceleration signal as a differentiation means since in the case of acceleration or deceleration the separation of the phase boundaries from one another changes.

Alternatively, in the case of a configuration with e.g. only one phase boundary and a differentiation means connected at the outlet side for detecting the positional change a dynamic positional change can be detected. The unambiguous nature of the acceleration signal is achieved by the fact that, as in the case of the previously known sensor, the detection signal determined is compared with zero with a time constant, so that a time-dependent signal detection which also changes unambiguously with the position of the phase boundary results. Preferably the time constant is chosen here so that the signals detected are leveled faster than in the case of normal operation; in particular in the case of the preferred area of application in motor vehicles in the case of normal driving, accelerations and decelerations as a result of the acceleration of the vehicle or as a result of braking of the vehicle result. In this way at least one slow rotation, as results in the case of the motion of a vehicle, e.g., at the time of the transition from driving up a mountain to driving down a valley, are differentiated from a rapid deceleration at the time of braking.

Further advantages result from the sub-claims and the following description of preferred specific embodiments.

REPRESENTATION OF PREFERRED SPECIFIC EMBODIMENTS

Figure 1:
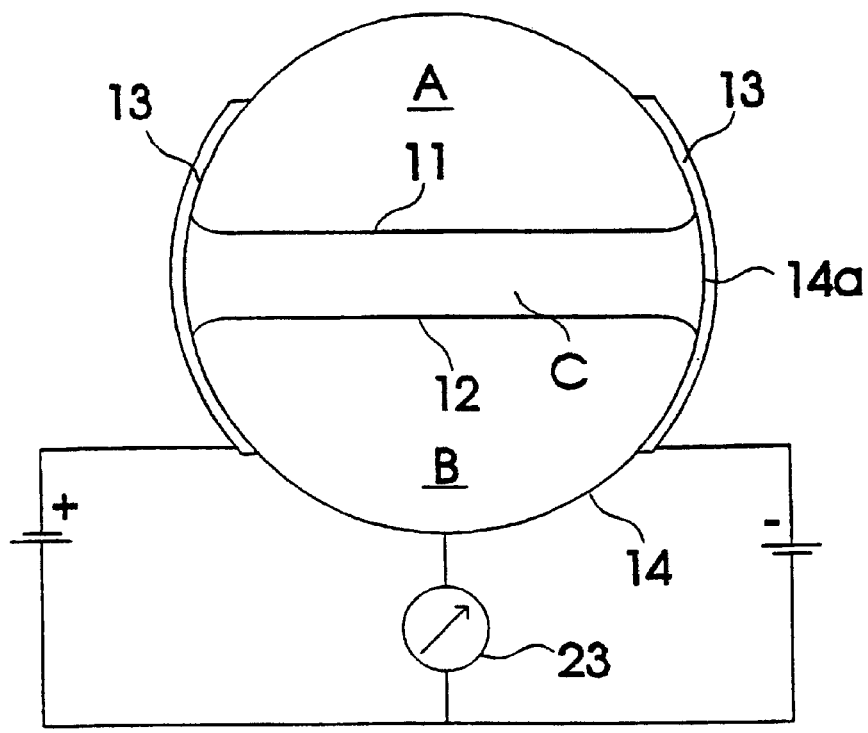
FIG. 1 is a schematic representation of an accelerometer in the resting position with associated circuitry in a side view.

The invention is explained further below by means of specific embodiments shown in the drawings. It is self-evident that these specific embodiments are not to be considered as an exhaustive enumeration and that the physical concept is not to be limited to the principle shown in the drawings.

An accelerometer 10 (FIG. 8) for detecting inertial forces is shown in the figures.

In the first specific embodiments of FIGS. 1–7, several media form at least two phase boundaries, which also behave dynamically differently in the case of the appearance of acceleration because of the different physical properties of the media. In the second specific embodiment of FIG. 9, it is possible to operate with only one phase boundary between two media A, B, since here the dynamic influences are leveled after their detection by the detection means 13 by means of a time constant Z. Thus, in all specific embodiments, there are differentiation means acting time-dependently, once in the form of the different media even before the detection, once electronically after the detection, which make it possible to differentiate the dynamic positional changes from the static positional changes.

In FIGS. 1–7 the accelerometer has at least three separable media A, B, C, at least two of which are liquid media B, C, and at most one of these media is a gaseous medium A. Thus basically therefore even three or more liquid media can be used, in a given case even without a gaseous medium. It is essential that these media be separable from one another and not miscible with one another. This leads to the fact that the media form at least two phase boundaries 11, 12 between each other as differentiation means. In the case of the appearance of an acceleration, detection means 13 now detect the positional change of the phase boundaries with respect to one another for the gradual determination of the acceleration. Therefore, while in the case of velocity remaining uniform, irrespective of the position in which the sensor is located, only a parallel position of the two phase boundaries 11, 12 occurs, and a picture according to FIG. 2 results in the case of the appearance of an acceleration or deceleration. In this way it is possible that the detection means 13, even if they are located only on one side in FIG. 2, can detect a moderate difference in the position of the two phase boundaries with respect to one another, therefore in the specific embodiment along the wall of the vessel 14 in order to determine a basically one-dimensional acceleration therefrom.

Figure 2:
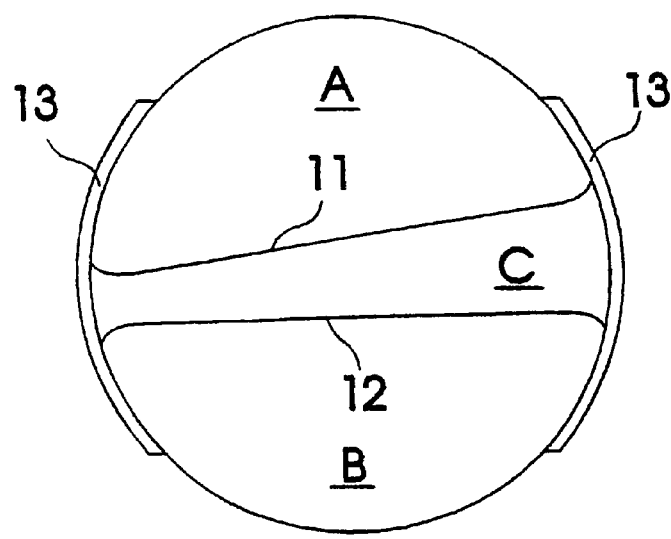
FIG. 2 is a representation according to FIG. 1 of a sensor deflected in the resting position as a result of an acceleration.

In the embodiment according to FIG. 2 there are detection means 13 at least at two points separated from one another, which detect the positional change of the two phase boundaries continuously. Different values are supplied from two points to a comparator 23, which determines a linear acceleration signal from the difference value of the two values detected. A more precise result can be determined from this difference value formation, since external influences, which influence both sides of the sensor, are masked by the difference value formation.

Preferably the two liquid media B, C have a different density, so that the liquid medium B is layered under the liquid C as a result of the higher density. Supplementarily it is desirable, in particular for achieving the effect shown in FIG. 2, if the two liquid media B, C also have different viscosities. If the liquid medium C has a lower viscosity, in the case of the appearance of an acceleration, this liquid medium C runs up on the vessel wall more rapidly than is to be expected from the slower liquid medium B. The sensitivity of the accelerometer can be influenced in one direction or another by means of a corresponding agreement of the viscosities.

The gaseous medium A air, the liquid medium B silicone oil, and the liquid medium C ethanol, have proved themselves to be particularly well-suited media. The two liquid media B, C are separable from one another and have different dielectrics.

Both media have nearly no surface tension to glass, so that exact values result when the media are put into a glass body. In addition the two liquid media also are differently light-conducting and light-permeable also in an optical respect, since the ethanol can, e.g. be dyed, so that a clear phase boundary also results for the light with respect to the silicone oil, since the dye is not imparted to the silicone oil. A corresponding embodiment is discussed in greater detail below.

FIGS. 1 and 2 show the accelerometer in a side view, this accelerometer advantageously being a one-dimensionally operating accelerometer. In this case the media are arranged over one another in a round vessel 14, or one at least rounded in the vertical direction. In order to achieve an optimal working point in the case of the positional change of the phase boundaries, the phase boundaries 11, 12 are located in the resting state approximately in the middle area 14a of the vessel, therefore in the area in which the vessel has its greatest horizontal extension. It is self-evident that the vessel can assume any shape here, only if it is assured that the phase boundaries can be registered there. In the case of using three media, one of these media, namely the liquid medium C, is located approximately in the middle area 14a of the vessel. Also in this middle area the detection means 13, or the emitting elements 18, are located on both sides of the vessel 14 in the specific embodiment of FIGS. 1 and 2, at least in an angular range around the middle area 14a since in the case of the preferred application in a vehicle which moves essentially in the horizontal direction, vertical phase boundaries usually do not occur. However, it is self-evident that the detection means necessarily also can be arranged correspondingly for other purposes.

Figure 3:
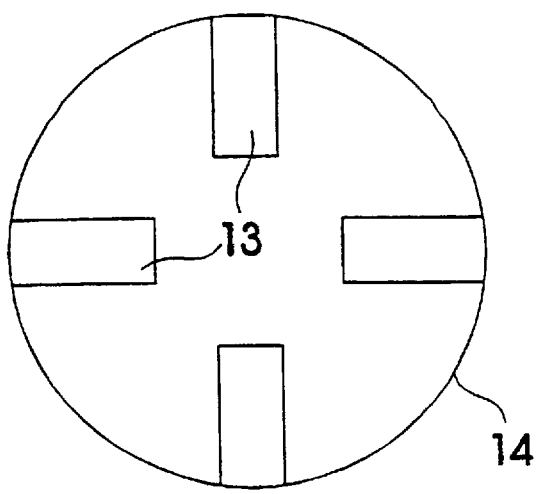
FIG. 3 is a top view of a spherical accelerometer.
Figure 8:
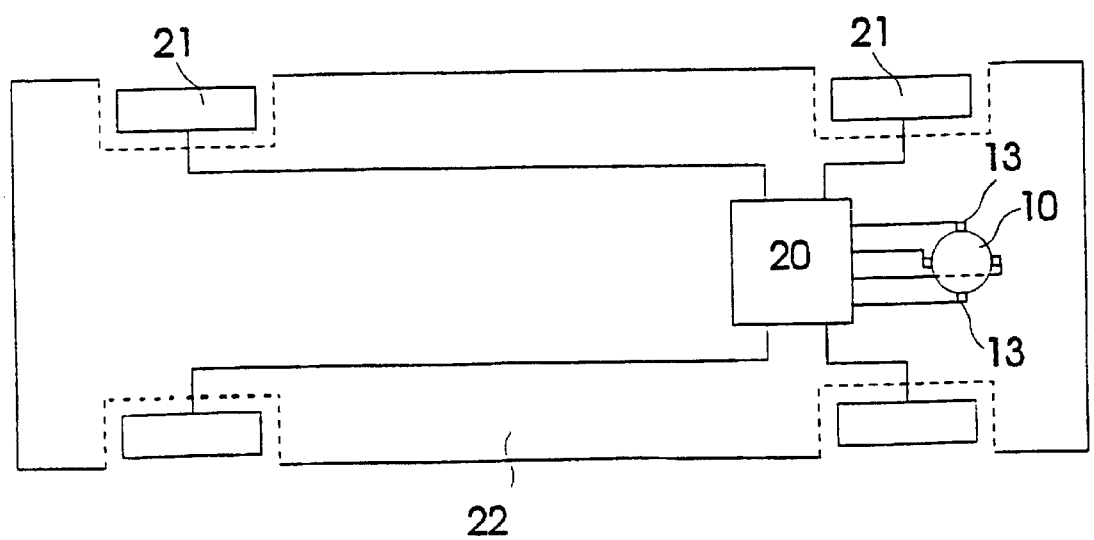
FIG. 8 is a schematic representation of a motor vehicle, in the case of which the accelerometer is used for braking force regulation.

For example, if the sensor is used in a motor vehicle according to FIG. 8, in order e.g. to detect what accelerations occur in the plane of motion of the vehicle when traveling around a curve, and to control the braking facilities correspondingly, the accelerometer also can be designed according to FIG. 3, so that the media A, B, C are arranged in a spherical vessel 14. Now in order to detect the acceleration in the plane of motion of the vehicle here, detection means 13 have to be located at least at three positions separated uniformly from one another on the circumference of the housing or the emitting elements 18 in the case of middle detection where the accelerometers are combined in a housing for plane detection. Preferably the detection means are located at four points, each individual position e.g. can be associated e.g. with a wheel 21 of the vehicle 22. the values determined by the detection means 13 then are conducted to an evaluation unit 20, which emits corresponding signals to the wheels 21 of the vehicle 22.

Figure 4:
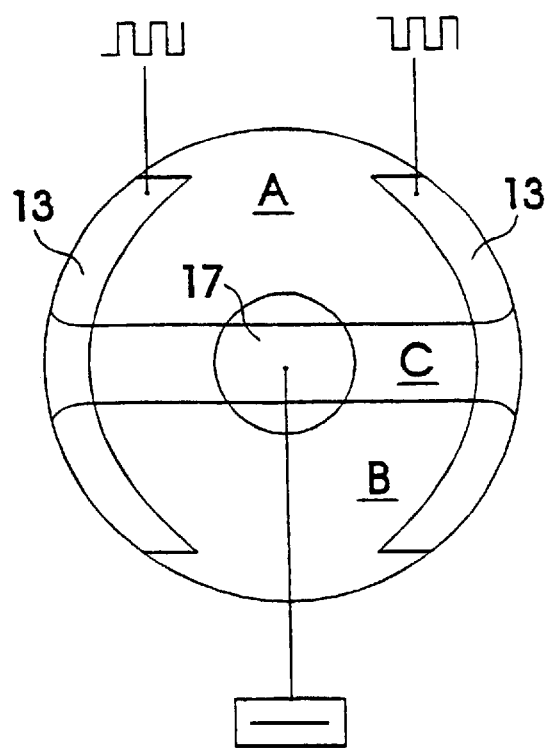
FIG. 4 is a representation according to FIG. 1 of an accelerometer in a further specific embodiment.

FIG. 4 shows electrodes, the wetting of which by the liquid medium C is detected, in the detection means 13. As a result of the wetting either the resistance can change, so that a resistive detection is possible, or in the case of different dielectrics of the media, the capacitance can change so that a capacitative detection is possible. FIG. 4 also makes clear that signals also can be emitted modulated to the two electrodes, which then are interrogated by the middle electrode 17.

Figure 5:
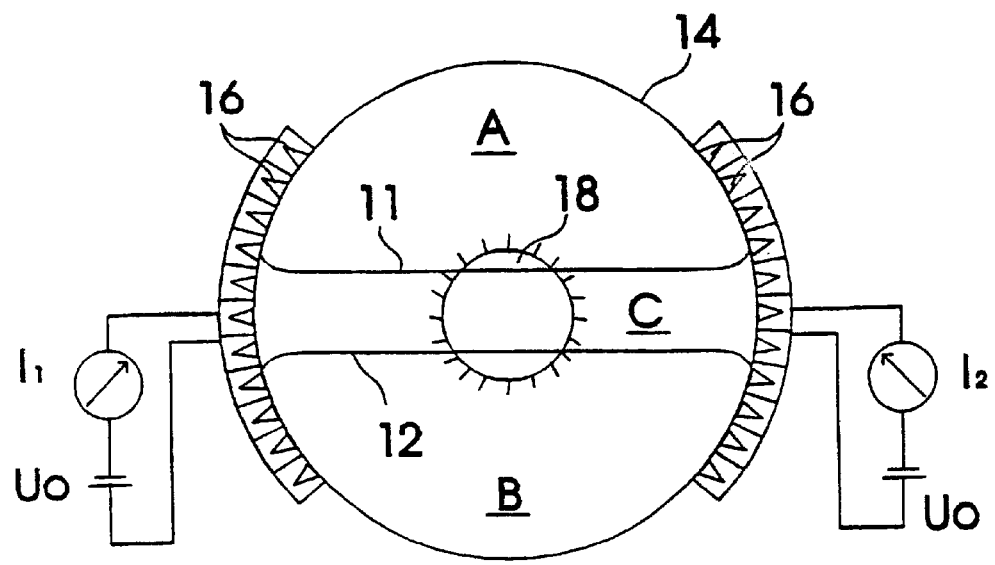
FIG. 5 is an accelerometer in a representation according to FIG. 4, in the case of which the light permeability of the media is measured.

FIG. 5 shows a further embodiment, in the case of which a further physical property of the media B and C is used. Basically the principle of the invention always is based on the use of different physical properties of the media A, B, C occurring on top of one another. At least one light-emitting element is provided in FIG. 5. The detection of the positional change of the phase boundaries is made optically here. The medium C has a different light permeability than the medium B, for example the medium B can be a black liquid. If now light is emitted, different values of the amount or strength of light, which can be evaluated as a measure of the acceleration, occur at least at one light-sensitive element 16 depending on the positional change of the phase boundaries 11, 12.

Figure 6:
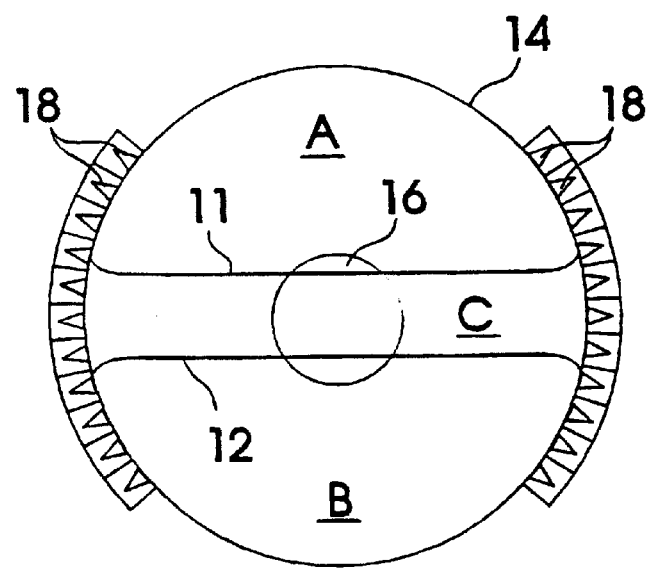
FIG. 6 is an accelerometer in a representation according to FIG. 4, in the case of which the light guide properties of the middle medium are detected.

A similar embodiment is shown in FIG. 6, in which case the liquid media B, C have diffuse light conductivity behaviors there, as was explained initially already with respect to the preferred liquids ethanol and silicone oil. A change in the phase boundaries here leads to an increase or decrease in the diffuse light guide—in the specific embodiment the medium C—, so that the light emitted on one side or laterally leads to different values on the detection means 13, as soon as the position of the phase boundaries changes.

The several light-emitting elements 18, can be e.g. light diodes, in FIG. 6, the vessel wall not being completely covered with light-emitting elements, but at most a uniform arrangement of the light diodes to each other. If these light diodes namely are arranged uniformly to one another, there is a fluctuation in the light intensity, since more or less light diodes beam into the light guide. However, since a difference value formation is made, this fluctuation—there equal on both sides—always leads to no acceleration signal. Of course a capacitative detection via field-emitting means and e.g. central field-detecting means also is possible. The wiring of the measuring sections and the detection element can be performed analogous to the application WO-A 95/01561 of the applicant, the disclosure content of which also is made the object of the present application.

Figure 7:
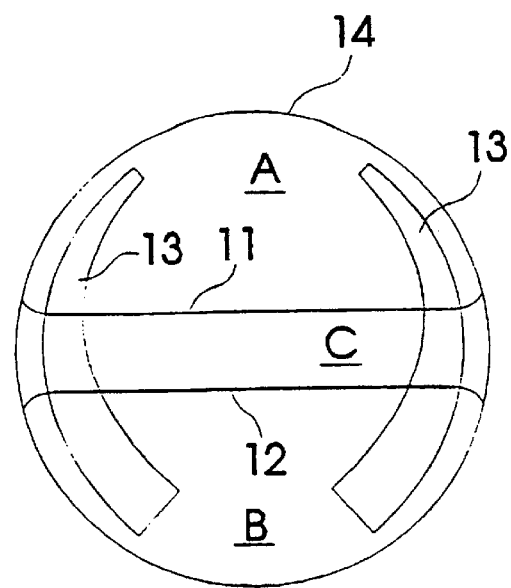
FIG. 7 is an accelerometer in a representation according to FIG. 1 with sickle-shaped detection elements.

According to FIG. 7 also electrodes for capacitative or resistive detection of the acceleration sensor made also as paired detection means 13, which are made sickle-shaped and arranged mirror-symmetrically to one another in such a way that, if the sensor is turned from the resting position, the value measured altogether by the electrode in the middle area remains unchanged . If the phase boundaries 11, 12 move here uniformly in the clockwise direction, the value on the right electrode in the effective dielectric range, therefore lying in the medium C, in the circumference increases, and the value of the left electrode decreases. On the other hand, if there is a non-uniform motion there is a measurable change in value. In this way it is possible to avoid error messages which can show, e.g. that the medium B has less dielectric behavior than the medium C, or the dielectric constants lie too close to one another.

Figure 9:
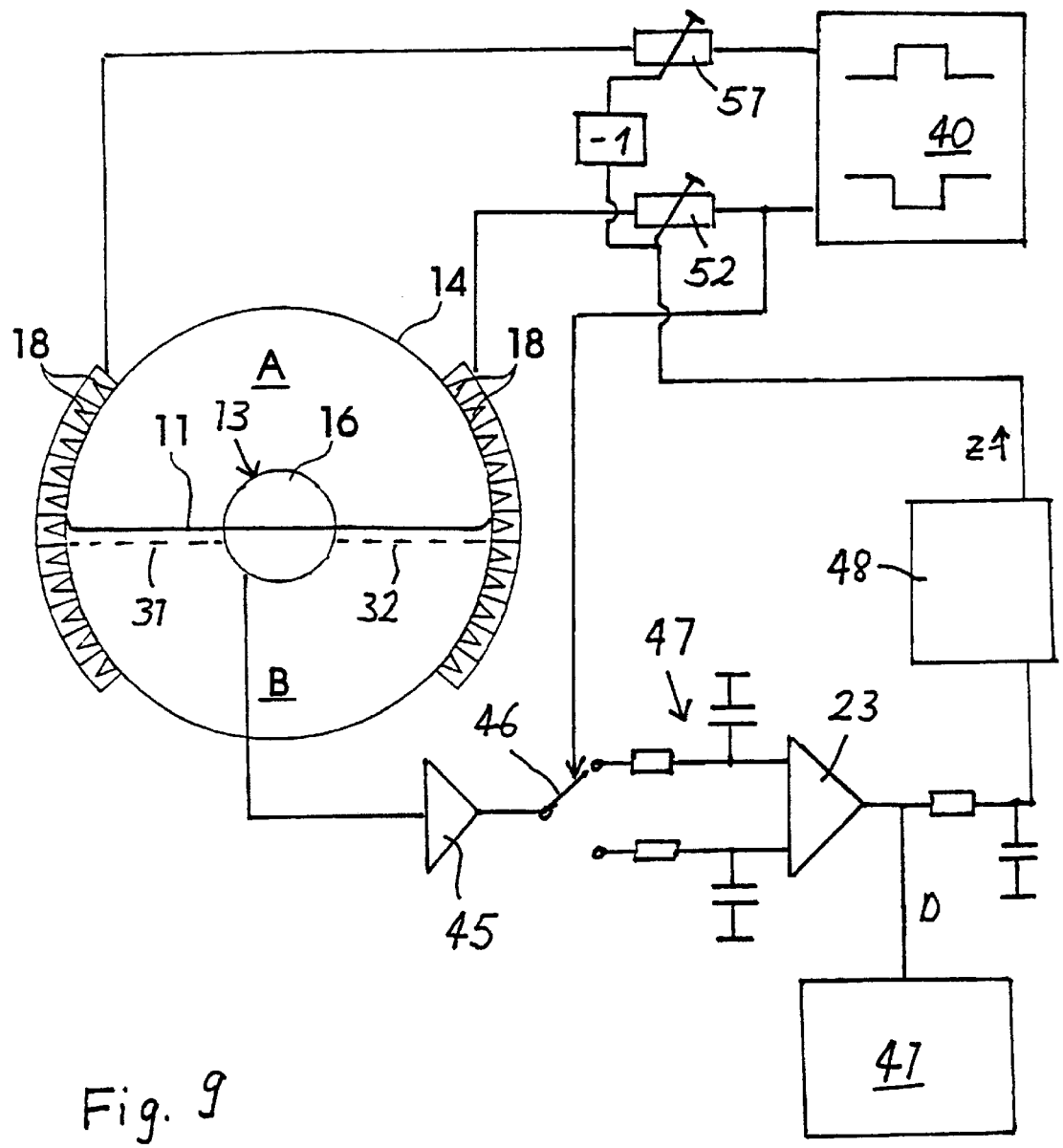
FIG. 9 is a schematic representation of an accelerometer in a second specific embodiment in resting position in a side view with a schematic circuit diagram for evaluating the detection signal.

In the specific embodiment of FIG. 9, an accelerometer for detecting inertial forces is shown which has in one vessel at least two separable and non-miscible media A, B, of which at least one medium A is liquid, and at most one medium is a gaseous medium B. This leads to the fact that the media form a phase boundary 11 between them. In the case of appearance of an acceleration, optical or capacitative detection means 13 detect the phase change of the phase boundary for gradual determination of the acceleration. Therefore while in the case of uniform velocity, irrespective of what position the sensor is in, only a static uniform position of the phase boundary 11 occurs, upon the appearance of an acceleration or deceleration, there is a dynamic position changing with time. In this way it is possible that the detection means 13 can detect the positional change of the phase boundary along the wall of the closed vessel 14.

The detection means 13 are provided at least at two points separated from one another so that two measuring section 31, 32 are formed. In this case a transmitter can be located in the center and at least two detection means 13 outside on the vessel wall or the transmitter on the vessel wall and one or more receivers e.g. in the center. It is essential only that there be several alternatingly interrogated measuring sections. The, in a given case different, values detected from both measuring sections are supplied to a comparator 23, which determines a linear acceleration signal from the difference value D of the two detection signals detected. By means of this difference value formation, it is possible to determine an exact result since external influences, which influence both sides of the sensor, are masked by the difference value formation. The media A, B can possess different densities or different viscosities in the first embodiment.

FIG. 9 shows the accelerometer in a side view, in the case of this accelerometer preferably it being a matter of a one-dimensionally operating accelerometer. In this case the media are arranged over one another in an e.g. flat vessel 14, at least round or rounded in the vertical direction. In order to achieve an optimal working point in the case of positional change of the phase boundaries, the phase boundaries 11, 12 are found in the resting state preferably approximately in the middle area 14a of the vessel.

The detection of the positional change of the phase boundaries can be performed optically or capacitatively. In FIG. 9 at least two elements 18 emitting light or an alternating electromagnetic field with at least one element separated therefrom, located in the middle, reacting sensitively to light or an alternating electromagnetic field, form two measuring sections 31, 32, which are suited to detect the position of the phase boundary 12. It is self-evident that transmitter and receiver can be exchanged. If there is an acceleration, different values e.g. of amount and intensity of the light or field strength, which can be evaluated as a measure of the acceleration, appear on the sensitive elements 16 depending on the positional change of the phase boundaries 11. In the case of capacitative solution the media A, B can possess e.g. different dielectric constants, so that their position is to be detected by the detection means.

The two measuring sections are switched on by a switch arrangement 40 in alternating intervals of time with a repeating switch sequence by which emitting means 18 are operated alternating. The signals are detected by the sensing element 16 and are supplied to a comparator 23 via the operational amplifier 45. The switch arrangement made as a timing generator also gives a signal of a switch 46, which switches the alternatingly appearing, detected signals of the two measuring sections 31, 32 with the switch sequence frequency, preferably via a high pass 47 to the two inputs of the comparator 23. The signal coming from the comparator and corresponding to the acceleration—the difference value D—which corresponds to the average value of the two amplitude values of the detection signals then is compared with zero with a time constant Z in a regulator 48, the structure of which also is known from WO 95/01561. The time constant Z preferably is chosen so that it is faster than the resulting changes in the position of the phase boundary 11, which occur in the case of a use in the motor vehicle area in the case of normal driving without the appearance of a brake signal. The time constant can be changed via an adjusting element or it is preset. The signal determined is fed both to the evaluation arrangement 41 as well as leveled simultaneously to zero. This takes place by the fact that the regulator 48 influences the output power of the two transmitting elements 18 via controllable resistances, the regulating signal being conducted inverted to the second transmitting element 18 on the basis of the timing of the measuring sections.

If a transmitting element 18 and several sensing elements 16 are provided, it is of little use to influence the output power for the leveling. In this case the amplification of the signals is influenced with a timed, inverted control signal on the two signal lines.

Except for the braking force regulation shown in FIG. 8, the accelerator also can be used e.g. for creating an active braking light which gives information concerning it to the following vehicle, if the vehicle actually is braked or accelerated, independent of the respective terrain circumstances, such as e.g. in the case of driving ascents of descents.

As an optical detection element we preferably used a sensor according to WO-A 95/01561, which in a given case is adapted for this purpose with respect to the time constant to be used for regulating the signals. The determination of the measured values proposed there at several measuring sections as well as the difference value formation between different measuring sections with regulation of the determined values, however, can be used also in the case of other types of the measured value detection, therefore not only in the case of detection in an optical way, but also in the case of measured value detection on a resistive, capacitative, or other way,

What is claimed is:

1. An accelerometer for detecting inertia forces, comprising:

a vessel having several separable and immiscible media held therein, wherein at most one medium is gaseous and the other media are liquid, and the media are arranged one above the other by gravity;

at least phase boundaries formed between the media;

a detector which detects a positional change of the phase boundaries in the case of an appearance of acceleration;

an evaluator which evaluates a dynamic positional change for gradual determination of the acceleration;

wherein the detector detects the positional change of the phase boundaries, which are formed by at least three separable and immiscible media, as a detection signal, at least two of the media being liquid;

wherein the detector determines the detection signal as an acceleration signal and feeds the acceleration signal to the evaluator; and wherein the media form between the phase boundaries independent of one another as discrimination means for discriminating the dynamic positional change from a static positional change.

2. The accelerometer according to claim 1, wherein the detector continuously detects the positional change at least at two points separated from one another and a comparator evaluates a difference value between positional change values detected at least at two points.

3. The accelerometer according to claim 1, wherein the two liquid media have a different viscosity.

4. The accelerometer according to claim 1, wherein the gaseous medium is air and the liquid media are silicone oil and ethanol.

5. The accelerometer according to claim 1, wherein the at least three media are arranged over one another in the vessel, the vessel having a rounded shape at least in a vertical direction, the phase boundaries in a resting state lie approximately in a middle area of the vessel, in which the vessel has greatest horizontal extension.

6. The accelerometer according to claim 5, wherein emitting elements are located at least in an angular range around the middle area in the case of a flat design of the vessel and in the case of detection in the middle on both sides of the vessel.

7. The accelerometer according to claim 5, wherein the vessel is spherical and that in the case of detection, emitting elements are located in the middle at least at three places separated from one another on a circumference of the vessel.

8. The accelerometer according to claim 1, wherein the detector comprises a plurality of electrodes, and detects wetting of the electrodes by the liquid media.

9. The accelerometer according to claim 8, wherein the plurality of electrodes are made as a paired detector in a sickle-shape and arranged in mirror symmetry to one another in such a way that if a sensor is turned out of a resting position, a difference value between resistive detection values measured on the electrodes as a whole remains unchanged despite of a different conductivity of the media.

10. The accelerometer according to claim 8, wherein the plurality of electrodes are made as a paired detector in a sickle-shape and arranged in mirror symmetry to one another in such a way that if a sensor is turned out of a resting position, a difference value between resistive detection values measured on the electrodes as a whole remains unchanged despite of a dielectric constant of the media.

11. The accelerometer according to claim 1, wherein the detector detects a displacement of the phase boundaries optically, at least one light-emitting element and at least one light-sensing element being provided.

12. The accelerometer according to claim 11, wherein the liquid media have different diffuse light permeabilities and light-sensing elements are provided as the detector, which detects the respective amount of light.

13. The accelerometer according to claim 11, wherein the liquid media have different diffuse light guide behavior and a change of the phase boundaries leads to the increase or decrease of the diffuse light guide.

14. An accelerometer for detecting inertia forces, comprising:

a vessel having several separable and immiscible media held therein, at most one medium of which is gaseous and the other media are liquid, at least one phase boundary formed between the media;

a detector which detects a positional change of the phase boundary in the case of an appearance of an acceleration;

a differentiator which distinguishes a dynamic positional change of the phase boundary from the static positional change;

an evaluator which evaluates the dynamic positional change for gradual determination of acceleration;

wherein the detector for detecting the positional change of the phase boundary interrogates at least two measuring sections which are formed by at least two emitting elements and at least one sensing element separated therefrom, whereby a switch arrangement connects the measuring sections at alternating intervals of time with a repeating switch sequence frequency for creating detection signals, which are interrogated on both measuring sections with the switch sequence frequency, and in which case a comparator determines a difference value between the detection signals of the two measuring sections as an acceleration signal and feeds the acceleration signal into the evaluator, a signal of the difference value coming from the comparator being compared with zero with a time constant (Z) in a regulator while the regulator regulates an output power of the elements emitting into the measuring sections.

15. The accelerometer according to claim 14, wherein the emitting elements are an electromagnetic alternating field, and the sensing elements react sensitively to an alternating electromagnetic field, and the detector is suited for a capacitative detection.

16. The accelerometer according to claim 14, wherein the media are arranged over one another in the vessel, the vessel having a rounded shape at least on the vertical direction, the phase boundary in a resting state lying in a middle area of the vessel in which the vessel has greatest horizontal extension.

17. The accelerometer according to claim 15, wherein the vessel is spherical, and the detector is located at least at three points separated from one another on a circumference of the vessel.

* * * * *

UNITED STATES PATENT AND TRADEMARK OFFICE
CERTIFICATE OF CORRECTION

PATENT NO. : 6,276,206 B1
DATED : August 21, 2001
INVENTOR(S) : Gerd Reime

It is certified that error appears in the above-identified patent and that said Letters Patent is hereby corrected as shown below:

Column 8,
Line 23, before "phase" delete "at least"

Signed and Sealed this

Twenty-fifth Day of January, 2005

JON W. DUDAS
*Director of the United States Patent and Trademark Office*